US012216247B2

(12) United States Patent
Jiang et al.

(10) Patent No.: US 12,216,247 B2
(45) Date of Patent: Feb. 4, 2025

(54) OPTICAL IMAGING LENS ASSEMBLY AND FINGERPRINT IDENTIFICATION DEVICE (71) Applicant: ZHEJIANG SUNNY OPTICS CO., LTD., Zhejiang (CN)

(72) Inventors: Wenchao Jiang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 582 days.

(21) Appl. No.: 17/575,671

(22) Filed: Jan. 14, 2022

(65) Prior Publication Data
US 2022/0244497 A1 Aug. 4, 2022

(30) Foreign Application Priority Data

Jan. 29, 2021 (CN) .......................... 202110127087.9

(51) Int. Cl.
G02B 13/00 (2006.01)
G02B 9/12 (2006.01)

(52) U.S. Cl.
CPC ........... *G02B 13/0035* (2013.01); *G02B 9/12* (2013.01); *G06F 2218/00* (2023.01)

(58) Field of Classification Search
CPC .... G02B 13/0035; G02B 9/12; G06F 2218/00
USPC ....................................................... 359/716
See application file for complete search history.

(56) References Cited

U.S. PATENT DOCUMENTS

| 2016/0205297 | A1* | 7/2016 | Chen | G02B 13/18 |
| | | | | 348/335 |
| 2017/0038559 | A1* | 2/2017 | Chen | G02B 9/12 |
| 2017/0090192 | A1* | 3/2017 | Iwasaki | G06V 40/10 |
| 2020/0174226 | A1* | 6/2020 | Lin | G02B 13/0035 |
| 2020/0326507 | A1* | 10/2020 | Hsueh | G06V 40/1318 |
| 2021/0200975 | A1* | 7/2021 | Yu | G02B 9/12 |
| 2021/0356708 | A1* | 11/2021 | Lin | G02B 9/12 |

FOREIGN PATENT DOCUMENTS

| CN | 105824108 A | 8/2016 |
| CN | 212160209 U | 12/2020 |

OTHER PUBLICATIONS

Corresponding CN application search results issued on Dec. 10, 2021.

* cited by examiner

Primary Examiner — Sharrief I Broome
(74) Attorney, Agent, or Firm — Samson G. Yu

(57) ABSTRACT

The disclosure provides an optical imaging lens assembly and a fingerprint identification device. The optical imaging lens assembly sequentially includes from an object side to an image side along an optical axis: a first lens with a negative refractive power; a second lens with a positive refractive power; and a third lens with a positive refractive power, an object-side surface thereof is a convex surface. A total effective focal length f of the optical imaging lens assembly and an Entrance Pupil Diameter (EPD) of the optical imaging lens assembly satisfy f/EPD<1.5. FOV is a maximum field of view of the optical imaging lens assembly, and FOV satisfies 140°<FOV<160°. By above reasonable arrangement, at least one of beneficial effects of large field of view, small size, large aperture, high imaging quality and the like of the optical imaging lens assembly is achieved.

14 Claims, 8 Drawing Sheets

OPTICAL IMAGING LENS ASSEMBLY AND FINGERPRINT IDENTIFICATION DEVICE

CROSS-REFERENCE TO RELATED PRESENT INVENTION(S)

The disclosure claims priority to and the benefit of Chinese Patent Present invention No. 202110127087.9, filed in the China National Intellectual Property Administration (CNIPA) on 29 Jan. 2021, which is incorporated herein by reference in its entirety.

TECHNICAL FIELD

The disclosure relates to the technical field of optical elements, and particularly to an optical imaging lens assembly and a fingerprint identification device with the optical imaging lens assembly.

BACKGROUND

At present, with the development of in-screen fingerprint identification technologies, manufacturers of portable electronic products such as smart phones have gradually started researching how to apply the in-screen fingerprint identification technologies to portable electronic products such as smart phones to make their products more competitive. Since a mobile phone screen such as an Organic Light-Emitting Diode (OLED) screen has relatively high light transmittance, an in-screen fingerprint identification device may be mounted below the OLED screen. The in-screen fingerprint identification device may receive reflected light formed after light emitted by the OLED screen is reflected by a finger to detect a fingerprint.

However, considering that the in-screen fingerprint identification device needs to be matched with a corresponding optical imaging lens assembly, mounting an in-screen fingerprint identification device is likely to cause relatively poor imaging quality due to the characteristics of relatively large size, relatively small field of view and aperture and the like of a conventional optical imaging lens assembly and further affect the working effect of the identification device.

SUMMARY

An embodiment of the disclosure provides an optical imaging lens assembly, which sequentially includes from an object side to an image side along an optical axis: a first lens with a negative refractive power, an object-side surface thereof is a concave surface, and an image-side surface thereof is a concave surface; a second lens with a positive refractive power, an object-side surface thereof is a convex surface, and an image-side surface thereof is a convex surface; and a third lens with a positive refractive power, an object-side surface thereof is a convex surface. A total effective focal length f of the optical imaging lens assembly and an Entrance Pupil Diameter (EPD) of the optical imaging lens assembly may satisfy $f/EPD<1.5$. FOV is a maximum field of view of the optical imaging lens assembly, and FOV may satisfy $140°<FOV<160°$.

In an implementation mode, at least one mirror surface in the object-side surface of the first lens to an image-side surface of the third lens is an aspheric mirror surface.

In an implementation mode, an effective focal length f1 of the first lens and the total effective focal length f of the optical imaging lens assembly may satisfy $-5.0<f1/f<-2.8$.

In an implementation mode, an effective focal length f2 of the second lens and the total effective focal length f of the optical imaging lens assembly may satisfy $4.6<f2/f<6.2$.

In an implementation mode, an effective focal length f3 of the third lens and the total effective focal length f of the optical imaging lens assembly may satisfy $2.0<f3/f<2.5$.

In an implementation mode, a curvature radius R3 of the object-side surface of the second lens and a curvature radius R4 of the image-side surface of the second lens may satisfy $1.2<(R3-R4)/(R3+R4)<3.4$.

In an implementation mode, a center thickness CT3 of the third lens on the optical axis and a curvature radius R5 of the object-side surface of the third lens may satisfy $1.4<CT3/R5<2.3$.

In an implementation mode, TTL is a distance from the object-side surface of the first lens to an imaging surface of the optical imaging lens assembly, and TTL and a spacing distance T12 of the first lens and the second lens on the optical axis may satisfy $2.5<TTL/T12<3.9$.

In an implementation mode, a center thickness CT1 of the first lens on the optical axis and a center thickness CT2 of the second lens on the optical axis may satisfy $1.0<CT2/CT1<1.7$.

In an implementation mode, an effective semi-diameter DT11 of the object-side surface of the first lens and an effective semi-diameter DT21 of the object-side surface of the second lens may satisfy $5.8<DT11/DT21<9.9$.

In an implementation mode, an effective semi-diameter DT32 of an image-side surface of the third lens and an effective semi-diameter DT22 of the image-side surface of the second lens may satisfy $2.1<DT32/DT22<2.9$.

In an implementation mode, SAG11 is a distance from an intersection point of the object-side surface of the first lens and the optical axis to an effective radius vertex of the object-side surface of the first lens on the optical axis, and SAG11 and an edge thickness ET1 of the first lens may satisfy $1.1<SAG11/ET1<2.1$.

In an implementation mode, an edge thickness ET3 of the third lens and an edge thickness ET2 of the second lens may satisfy $1.7<ET3/ET2<3.9$.

In an implementation mode, the optical imaging lens assembly further includes a diaphragm. SL is a distance from the diaphragm to an imaging surface of the optical imaging lens assembly on the optical axis, and SL and a combined focal length f23 of the second lens and the third lens may satisfy $2.9<SL/f23<3.5$.

Another embodiment of the disclosure also provides an optical imaging lens assembly, which sequentially includes from an object side to an image side along an optical axis: a first lens with a negative refractive power, an object-side surface thereof is a concave surface, and an image-side surface thereof is a concave surface; a second lens with a positive refractive power, an object-side surface thereof is a convex surface, and an image-side surface thereof is a convex surface; and a third lens with a positive refractive power, an object-side surface thereof is a convex surface. A total effective focal length f of the optical imaging lens assembly and an Entrance Pupil Diameter (EPD) of the optical imaging lens assembly may satisfy $f/EPD<1.5$. A center thickness CT3 of the third lens on the optical axis and a curvature radius R5 of the object-side surface of the third lens may satisfy $1.4<CT3/R5<2.3$.

In an implementation mode, an effective focal length f1 of the first lens and the total effective focal length f of the optical imaging lens assembly may satisfy $-5.0<f1/f<-2.8$.

In an implementation mode, an effective focal length f2 of the second lens and the total effective focal length f of the optical imaging lens assembly may satisfy $4.6<f2/f<6.2$.

In an implementation mode, an effective focal length f3 of the third lens and the total effective focal length f of the optical imaging lens assembly may satisfy $2.0<f3/f<2.5$.

In an implementation mode, a curvature radius R3 of the object-side surface of the second lens and a curvature radius R4 of the image-side surface of the second lens may satisfy $1.2<(R3-R4)/(R3+R4)<3.4$.

In an implementation mode, TTL is a distance from the object-side surface of the first lens to an imaging surface of the optical imaging lens assembly, and TTL and a spacing distance T12 of the first lens and the second lens on the optical axis may satisfy $2.5<TTL/T12<3.9$.

In an implementation mode, a center thickness CT1 of the first lens on the optical axis and a center thickness CT2 of the second lens on the optical axis may satisfy $1.0<CT2/CT1<1.7$.

In an implementation mode, an effective semi-diameter DT11 of the object-side surface of the first lens and an effective semi-diameter DT21 of the object-side surface of the second lens may satisfy $5.8<DT11/DT21<9.9$.

In an implementation mode, an effective semi-diameter DT32 of an image-side surface of the third lens and an effective semi-diameter DT22 of the image-side surface of the second lens may satisfy $2.1<DT32/DT22<2.9$.

In an implementation mode, SAG11 is a distance from an intersection point of the object-side surface of the first lens and the optical axis to an effective radius vertex of the object-side surface of the first lens on the optical axis, and SAG11 and an edge thickness ET1 of the first lens may satisfy $1.1<SAG11/ET1<2.1$.

In an implementation mode, an edge thickness ET3 of the third lens and an edge thickness ET2 of the second lens may satisfy $1.7<ET3/ET2<3.9$.

In an implementation mode, the optical imaging lens assembly further includes a diaphragm. SL is a distance from the diaphragm to an imaging surface of the optical imaging lens assembly on the optical axis, and SL and a combined focal length f23 of the second lens and the third lens may satisfy $2.9<SL/f23<3.5$.

In an implementation mode, FOV is a maximum field of view of the optical imaging lens assembly, and FOV may satisfy $140°<FOV<160°$.

Another embodiment of the disclosure also provides a fingerprint identification device, which includes: the above-mentioned optical imaging lens assembly, further including a glass screen on an object side; and an imaging sensor, configured to convert an optical signal entering the imaging sensor from the optical imaging lens assembly into an electric signal.

According to the disclosure, three lenses are adopted, and the refractive power and surface types of each lens, the center thickness of each lens, on-axis spacing distances between the lenses and the like are configured reasonably to achieve at least one of beneficial effects of large field of view, small size, large aperture, high imaging quality and the like of the optical imaging lens assembly.

BRIEF DESCRIPTION OF THE DRAWINGS

The other features, objectives and advantages of the disclosure become more apparent upon reading detailed descriptions made to unrestrictive embodiments with reference to the following drawings.

DETAILED DESCRIPTION OF THE EMBODIMENTS

In order to understand the disclosure better, more detailed descriptions will be made to each aspect of the disclosure with reference to the drawings. It is to be understood that these detailed descriptions are only descriptions about the exemplary embodiments of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary embodiment of the disclosure may include, for example, three lenses, i.e., a first lens, a second lens and a third lens respectively. The three lenses are sequentially arranged from an object side to an image side along an optical axis. There may be a spacing distance between any two adjacent lenses in the first lens to the third lens.

In an exemplary embodiment, the first lens may have a negative refractive power, and an object-side surface thereof may be a concave surface, and an image-side surface thereof may be a concave surface. The second lens may have a positive refractive power, and an object-side surface thereof may be a convex surface, and an image-side surface thereof may be a convex surface. The third lens has a positive refractive power, and an object-side surface thereof may be a convex surface.

In the exemplary embodiment, the first lens is set to have the negative refractive power to facilitate the divergence of light. Both the second lens and the third lens are set to have the positive refractive power to facilitate the convergence of light. The refractive power of the first lens, the second lens and the third lens is configured reasonably, so that spherical aberrations and chromatic aberrations generated by the three lenses may be balanced effectively, the lens may have better refractive power, and the improvement of the imaging quality of the lens is facilitated. The first lens has a concave-concave surface type, the second lens has a convex-convex surface type, and the object-side surface of the third lens is a convex surface, so that the machinability of the three lenses may be improved on the basis of ensuring the imaging performance of the lens.

In an exemplary embodiment, the optical imaging lens assembly according to the disclosure may satisfy f/EPD<1.5, wherein f is a total effective focal length of the optical imaging lens assembly, and EPD is an entrance pupil diameter of the optical imaging lens assembly. f/EPD<1.5 is satisfied, so that the miniaturization of the optical imaging lens assembly may be ensured, and meanwhile, a luminous flux of the lens is enough to ensure relatively high illumination on an imaging surface of the lens to achieve relatively high imaging quality of the lens during shooting at night or in an environment with relatively weak light energy.

In an exemplary embodiment, the optical imaging lens assembly according to the disclosure may satisfy 140°<FOV<160°, wherein FOV is a maximum field of view of the optical imaging lens assembly. More specifically, FOV may further satisfy 140°<FOV<151°. Satisfying 140°<FOV<160° is favorable for obtaining a subject in a larger field of view in a practical shooting process to achieve a relatively wide identification range of the optical imaging lens assembly.

In an exemplary embodiment, the optical imaging lens assembly according to the disclosure may satisfy −5.0<f1/f<−2.8, wherein f1 is an effective focal length of the first lens, and f is a total effective focal length of the optical imaging lens assembly. −5.0<f1/f<−2.8 is satisfied, so that high machinability of the first lens may be ensured.

In an exemplary embodiment, the optical imaging lens assembly according to the disclosure may satisfy 4.6<f2/f<6.2, wherein f2 is an effective focal length of the second lens, and f is a total effective focal length of the optical imaging lens assembly. 4.6<f2/f<6.2 is satisfied, so that high machinability of the second lens may be ensured.

In an exemplary embodiment, the optical imaging lens assembly according to the disclosure may satisfy 2.0<f3/f<2.5, wherein f3 is an effective focal length of the third lens, and f is a total effective focal length of the optical imaging lens assembly. 2.0<f3/f<2.5 is satisfied, so that high machinability of the third lens may be ensured.

In an exemplary embodiment, the optical imaging lens assembly according to the disclosure may satisfy 1.2<(R3−R4)/(R3+R4)<3.4, wherein R3 is a curvature radius of the object-side surface of the second lens, and R4 is a curvature radius of the image-side surface of the second lens. 1.2<(R3−R4)/(R3+R4)<3.4 is satisfied, so that light in the lens may be converged effectively to reduce a total reflection of the light in an off-axis field of view, and further reduce ghost images of the lens, and the machining of a field angle of the second lens may also be controlled to shape the lens in a forming process range to facilitate the practical machining of the second lens.

In an exemplary embodiment, the optical imaging lens assembly according to the disclosure may satisfy 1.4<CT3/R5<2.3, wherein CT3 is a center thickness of the third lens on the optical axis, and R5 is a curvature radius of the object-side surface of the third lens. 1.4<CT3/R5<2.3 is satisfied, so that the thickness sensitivity of the third lens may be reduced, and a field curvature of the lens may be corrected.

In an exemplary embodiment, the optical imaging lens assembly according to the disclosure may satisfy 2.5<TTL/T12<3.9, wherein TTL is a distance from the object-side surface of the first lens to an imaging surface of the optical imaging lens assembly on the optical axis, and T12 is a spacing distance of the first lens and the second lens on the optical axis. 2.5<TTL/T12<3.9 is satisfied, so that the characteristics of ultra-thin design, high resolution and the like of the optical imaging lens assembly may be achieved.

In an exemplary embodiment, the optical imaging lens assembly according to the disclosure may satisfy 1.0<CT2/CT1<1.7, wherein CT1 is a center thickness of the first lens on the optical axis, and CT2 is a center thickness of the second lens on the optical axis. 1.0<CT2/CT1<1.7 is satisfied, so that a distortion of the lens may be reduced effectively to reduce a ghost image risk caused by the reflection of light in the lens, the size of the optical imaging lens assembly may also be reduced to avoid the optical imaging lens assembly being too large, and difficulties in assembling of the second lens and the first lens may also be reduced to improve the space utilization of the optical imaging lens assembly.

In an exemplary embodiment, the optical imaging lens assembly according to the disclosure may satisfy 5.8<DT11/DT21<9.9, wherein DT11 is an effective semi-diameter of the object-side surface of the first lens, and DT21 is an effective semi-diameter of the object-side surface of the second lens. Satisfying 5.8<DT11/DT21<9.9 is favorable for controlling an assembling segment gap of the first lens and the second lens in the optical imaging lens assembly in a reasonable machining range to facilitate the forming machining and assembling of each lens, and meanwhile, may achieve a relatively high luminous flux in an off-axis field of view of the lens.

In an exemplary embodiment, the optical imaging lens assembly according to the disclosure may satisfy 2.1<DT32/DT22<2.9, wherein DT32 is an effective semi-diameter of an image-side surface of the third lens, and DT22 is an effective semi-diameter of the image-side surface of the second lens. Satisfying 2.1<DT32/DT22<2.9 is favorable for controlling an assembling segment gap of the second lens and the third lens in the optical imaging lens assembly in a reasonable machining range to facilitate the forming machining and assembling of each lens, and meanwhile, may achieve a relatively high luminous flux in an off-axis field of view of the lens.

In an exemplary embodiment, the optical imaging lens assembly according to the disclosure may satisfy 1.1<SAG11/ET1<2.1, wherein SAG11 is a distance from an intersection point of the object-side surface of the first lens and the optical axis to an effective radius vertex of the object-side surface of the first lens on the optical axis, and ET1 is an edge thickness of the first lens. Satisfying 1.1<SAG11/ET1<2.1 is favorable for regulating a chief ray angle of the optical imaging lens assembly and may effectively improve the relative brightness of the optical imaging lens assembly, improve the identification accuracy of the optical imaging lens assembly and improve the resolution of the image surface.

In an exemplary embodiment, the optical imaging lens assembly according to the disclosure may satisfy 1.7<ET3/ET2<3.9, wherein ET3 is an edge thickness of the third lens, and ET2 is an edge thickness of the second lens. 1.7<ET3/ET2<3.9 is satisfied, so that a distortion of the lens may be reduced effectively to reduce a ghost image risk caused by the reflection of light in the lens.

In an exemplary embodiment, the optical imaging lens assembly according to the disclosure further includes a diaphragm arranged between the first lens and the second lens. The optical imaging lens assembly according to the disclosure may satisfy 2.9<SL/f23<3.5, wherein SL is a distance from the diaphragm to an imaging surface of the optical imaging lens assembly on the optical axis, and f23 is a combined focal length of the second lens and the third lens. Satisfying 2.9<SL/f23<3.5 is favorable for regulating a chief ray angle of the optical imaging lens assembly and may effectively improve the relative brightness of the optical imaging lens assembly, improve the identification accuracy of the optical imaging lens assembly and improve the resolution of the image surface.

In an exemplary embodiment, the optical imaging lens assembly according to the disclosure further includes a glass screen arranged between the object side and the first lens. In an embodiment, the optical imaging lens assembly may further include an optical filter configured to correct the chromatic aberration and/or a protective glass configured to protect a photosensitive element on the imaging surface.

The optical imaging lens assembly according to the embodiment of the disclosure may adopt multiple lenses, for example, the above-mentioned three. The refractive power and surface types of each lens, the center thickness of each lens, on-axis spacing distances between the lenses and the like may be reasonably configured to effectively converge incident light, reduce a total track length of the imaging lens assembly, improve the machinability of the imaging lens assembly and ensure that the optical imaging lens assembly is more favorable for production and machining. The disclosure provides an optical imaging lens assembly with the characteristics of, for example, small size, large field of view, large aperture, high imaging quality, etc. The optical imaging lens assembly according to the disclosure may be used for an in-screen fingerprint identification device.

In the embodiment of the disclosure, at least one of mirror surfaces of each lens is an aspheric mirror surface. That is, at least one mirror surface in the object-side surface of the first lens to the image-side surface of the third lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. In an embodiment, at least one of the object-side surface and image-side surface of each of the first lens, the second lens and the third lens is an aspheric mirror surface. In another embodiment, both the object-side surface and the image-side surface of each of the first lens, the second lens and the third lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the embodiment with three lenses as an example, the optical imaging lens assembly is not limited to three lenses. If necessary, the optical imaging lens assembly may further include another number of lenses.

Specific embodiments applied to the optical imaging lens assembly of the above-mentioned embodiment will further be described below with reference to the drawings.

Embodiment 1

Figure 1:
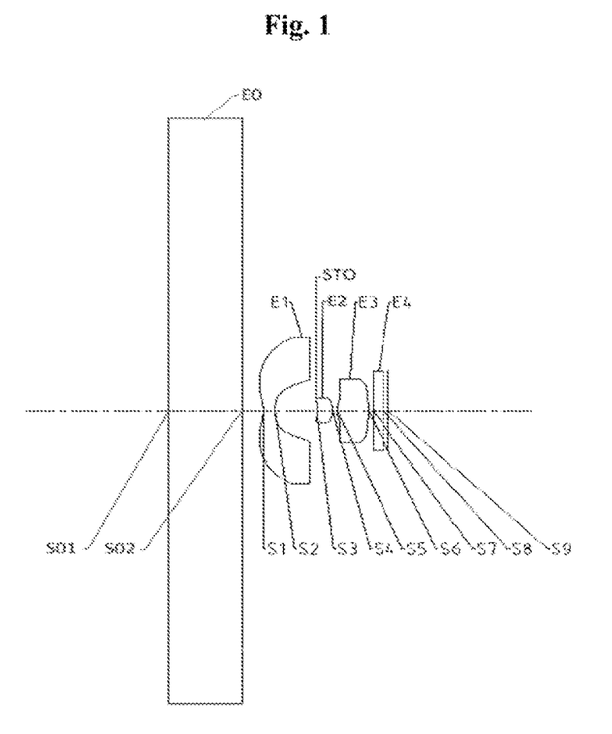
FIG. 1 shows a structural schematic diagram of an optical imaging lens assembly according to Embodiment 1 of the disclosure.

An optical imaging lens assembly according to Embodiment 1 of the disclosure will be described below with reference to FIGS. 1-2B. FIG. 1 shows a structural schematic diagram of an optical imaging lens assembly according to Embodiment 1 of the disclosure.

As shown in FIG. 1, the optical imaging lens assembly sequentially includes from an object side to an image side:

a glass screen E0, a first lens E1, a diaphragm STO, a second lens E2, a third lens E3, an optical filter E4 and an imaging surface S9.

The glass screen E0 has an object-side surface S01 and an image-side surface S02. The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a positive refractive power, an object-side surface S5 thereof is a convex surface, and an image-side surface S6 thereof is a convex surface. The optical filter E4 has an object-side surface S7 and an image-side surface S8. Light from an object sequentially passes through each of the surfaces S01 to S8 and is finally imaged on the imaging surface S9.

Table 1 shows a basic parameter table of the optical imaging lens assembly of Embodiment 1, wherein the units of the curvature radius, the thickness/distance and the focal length are all millimeters (mm).

surface S9 of the optical imaging lens assembly, and ImgH is 1.01 mm. FOV is a maximum field of view of the optical imaging lens assembly, and FOV is 149.9°.

In Embodiment 1, both the object-side surface and the image-side surface of any lens in the first lens E1 to the third lens E3 are aspheric surfaces. A surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a vector height of a distance between the aspheric surface and a vertex of the aspheric surface when the aspheric surface is located at a position with the height h in the optical axis direction; c is a paraxial curvature of the

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 1.0300E−06 | | | | |
| S01 | Spherical | Infinite | 1.5450 | 1.52 | 64.2 | | |
| S02 | Spherical | Infinite | 0.4345 | | | | |
| S1 | Aspheric | −0.9000 | 0.2445 | 1.62 | 25.9 | −0.92 | −6.0982 |
| S2 | Aspheric | 1.6603 | 0.8648 | | | | 2.9642 |
| STO | Spherical | Infinite | 0.0070 | | | | |
| S3 | Aspheric | 5.9712 | 0.3270 | 1.54 | 56.1 | 1.55 | −90.0000 |
| S4 | Aspheric | −0.9635 | 0.1000 | | | | 8.2516 |
| S5 | Aspheric | 0.3765 | 0.6591 | 1.54 | 56.1 | 0.61 | −88.0757 |
| S6 | Aspheric | −1.0634 | 0.1000 | | | | −0.9912 |
| S7 | Spherical | Infinite | 0.2163 | 1.52 | 64.2 | | |
| S8 | Spherical | Infinite | 0.1036 | | | | |
| S9 | Spherical | Infinite | | | | | |

In the embodiment, a total effective focal length f of the optical imaging lens assembly is 0.26 mm. TTL is a total length of the optical imaging lens assembly (i.e., a distance from the object-side surface S1 of the first lens E1 to the imaging surface S9 of the optical imaging lens assembly on an optical axis), and TTL is 2.62 mm. ImgH is a half of a diagonal length of an effective pixel region on the imaging aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18 and A20 that may be used for the aspheric mirror surfaces S1-S6 in Embodiment 1.

TABLE 2

| Surface number | A4 | A6 | A8 | A10 | A12 |
|---|---|---|---|---|---|
| S1 | 7.4313E−01 | −1.0624E+00 | 9.7175E−01 | −5.5765E−01 | 2.0082E−01 |
| S2 | 6.8508E+00 | −1.0964E+02 | 1.0972E+03 | −6.2184E+03 | 2.1182E+04 |
| S3 | −9.1461E+00 | 1.0600E+03 | −9.7985E+04 | 5.1344E+06 | −1.6180E+08 |
| S4 | −1.4856E+01 | 4.4545E+02 | −1.2442E+04 | 2.3623E+05 | −2.9339E+06 |
| S5 | 3.1083E+01 | −1.3399E+03 | 3.3976E+04 | −5.4345E+05 | 5.5590E+06 |
| S6 | 1.9912E+00 | 2.9093E+01 | −8.2985E+02 | 1.1088E+04 | −9.0427E+04 |

| Surface number | A14 | A16 | A18 | A20 |
|---|---|---|---|---|
| S1 | −4.4532E−02 | 5.8532E−03 | −4.1683E−04 | 1.2377E−05 |
| S2 | −4.3851E+04 | 5.3811E+04 | −3.5994E+04 | 1.0133E+04 |
| S3 | 2.9733E+09 | −2.9435E+10 | 1.2301E+11 | 0.0000E+00 |
| S4 | 2.3543E+07 | −1.1853E+08 | 3.4012E+08 | −4.2420E+08 |
| S5 | −3.6184E+07 | 1.4464E+08 | −3.2312E+08 | 3.0837E+08 |
| S6 | 4.7002E+05 | −1.5993E+06 | 3.6076E+06 | −5.3567E+06 |

Figure 2A:
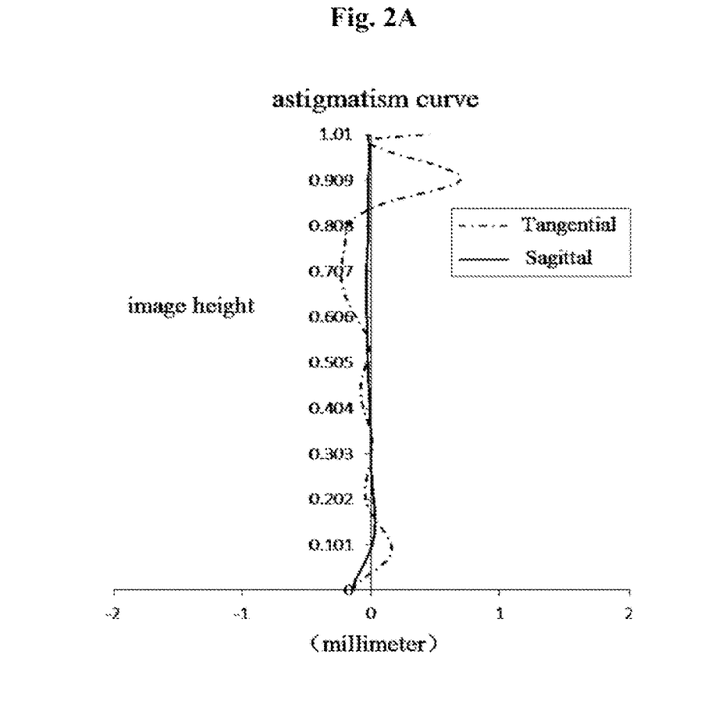
FIGS. 2A-2B show an astigmatism curve and a distortion curve of an optical imaging lens assembly according to Embodiment 1 respectively.
Figure 2B:
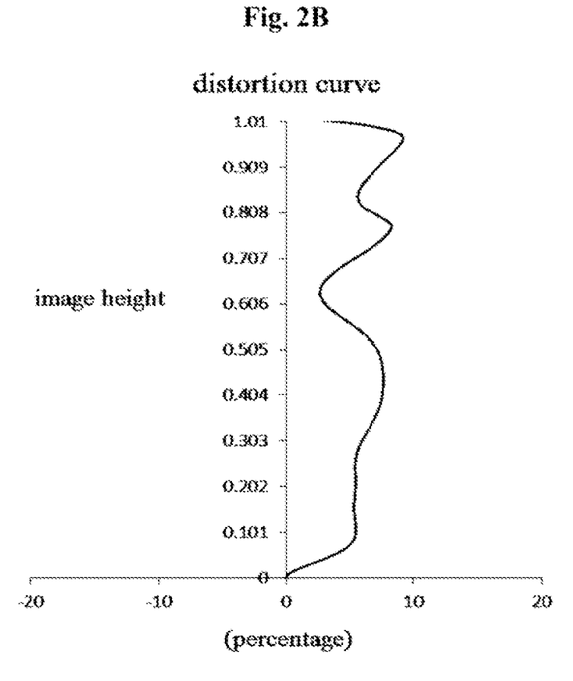

FIG. 2A shows an astigmatism curve of the optical imaging lens assembly according to Embodiment 1 to represent a tangential image surface curvature and a sagittal image surface curvature. FIG. 2B shows a distortion curve of the optical imaging lens assembly according to Embodiment 1 to represent distortion values corresponding to different image heights. According to FIGS. 2A-2B, it can be seen that the optical imaging lens assembly provided in Embodiment 1 may achieve high imaging quality.

Embodiment 2

Figure 3:
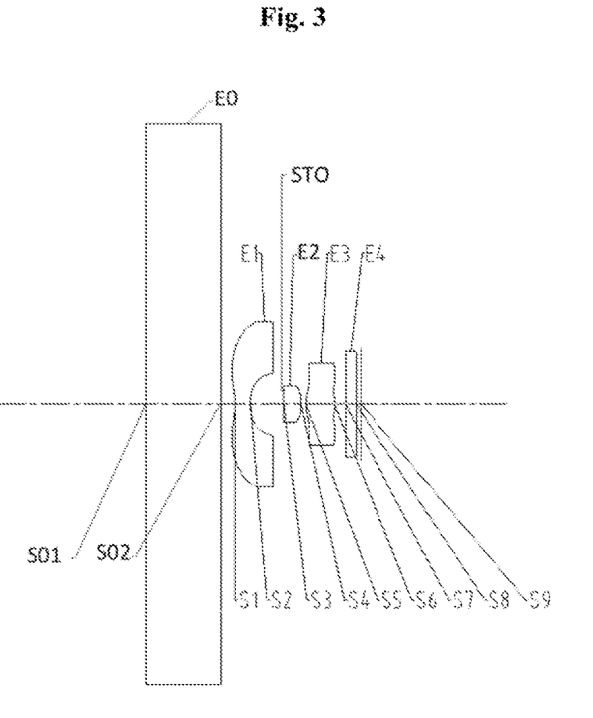
FIG. 3 shows a structural schematic diagram of an optical imaging lens assembly according to Embodiment 2 of the disclosure.

An optical imaging lens assembly according to Embodiment 2 of the disclosure will be described below with reference to FIGS. 3-4B. In the embodiment and the following embodiments, parts of descriptions similar to those about Embodiment 1 are omitted for simplicity. FIG. 3 shows a structural schematic diagram of an optical imaging lens assembly according to Embodiment 2 of the disclosure.

As shown in FIG. 3, the optical imaging lens assembly sequentially includes from an object side to an image side: a glass screen E0, a first lens E1, a diaphragm STO, a second lens E2, a third lens E3, an optical filter E4 and an imaging surface S9.

The glass screen E0 has an object-side surface S01 and an image-side surface S02. The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a positive refractive power, an object-side surface S5 thereof is a convex surface, and an image-side surface S6 thereof is a convex surface. The optical filter E4 has an object-side surface S7 and an image-side surface S8. Light from an object sequentially passed through each of the surfaces S01 to S8 and is finally imaged on the imaging surface S9.

In the embodiment, a total effective focal length f of the optical imaging lens assembly is 0.30 mm. TTL is a total length of the optical imaging lens assembly, and TTL is 2.58 mm. ImgH is a half of a diagonal length of an effective pixel region on the imaging surface S9 of the optical imaging lens assembly, and ImgH is 0.96 mm. FOV is a field of view of the optical imaging lens assembly, and FOV is maximally 145.7°.

Table 3 shows a basic parameter table of the optical imaging lens assembly of Embodiment 2, wherein the units of the curvature radius, the thickness/distance and the focal length are all millimeters (mm). Table 4 shows high-order coefficients that may be used for each aspheric mirror surface in Embodiment 2. A surface type of each aspheric surface may be defined by the formula (1) given in Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 1.0300E−06 | | | | |
| S01 | Spherical | Infinite | 1.5450 | 1.52 | 64.2 | | |
| S02 | Spherical | Infinite | 0.2852 | | | | |
| S1 | Aspheric | −0.9000 | 0.3116 | 1.62 | 25.9 | −0.90 | −3.5274 |
| S2 | Aspheric | 1.6259 | 0.6794 | | | | −0.5004 |
| STO | Spherical | Infinite | 0.0020 | | | | |
| S3 | Aspheric | 2.1263 | 0.3514 | 1.54 | 56.1 | 1.41 | −72.0051 |
| S4 | Aspheric | −1.1352 | 0.1001 | | | | 10.0264 |
| S5 | Aspheric | 0.3773 | 0.5815 | 1.54 | 56.1 | 0.67 | −83.5801 |
| S6 | Aspheric | −4.4168 | 0.2316 | | | | 18.7978 |
| S7 | Spherical | Infinite | 0.2163 | 1.52 | 64.2 | | |
| S8 | Spherical | Infinite | 0.1036 | | | | |
| S9 | Spherical | Infinite | | | | | |

TABLE 4

| Surface number | A4 | A6 | A8 | A10 | A12 |
|---|---|---|---|---|---|
| S1 | 1.4035E+00 | −2.6991E+00 | 3.3386E+00 | −2.6646E+00 | 1.3685E+00 |
| S2 | 1.0750E+01 | −2.1549E+02 | 3.0528E+03 | −2.3898E+04 | 1.0833E+05 |
| S3 | −1.6047E+01 | 3.3712E+03 | −3.7512E+05 | 2.2418E+07 | −7.6511E+08 |
| S4 | −1.4099E+01 | 4.3961E+02 | −1.2451E+04 | 2.3638E+05 | −2.9339E+06 |
| S5 | 3.1012E+01 | −1.3347E+03 | 3.3939E+04 | −5.4336E+05 | 5.5590E+06 |
| S6 | −1.6549E+00 | 1.2732E+02 | −2.6955E+03 | 3.3238E+04 | −2.6421E+05 |

| Surface number | A14 | A16 | A18 | A20 |
|---|---|---|---|---|
| S1 | −4.3740E−01 | 8.3003E−02 | −8.5180E−03 | 3.6347E−04 |
| S2 | −2.8566E+05 | 4.3145E+05 | −3.4777E+05 | 1.1720E+05 |
| S3 | 1.4877E+10 | −1.5325E+11 | 6.4860E+11 | 0.0000E+00 |
| S4 | 2.3543E+07 | −1.1853E+08 | 3.4012E+08 | −4.2420E+08 |
| S5 | −3.6184E+07 | 1.4464E+08 | −3.2312E+08 | 3.0837E+08 |
| S6 | 1.4071E+06 | −5.1140E+06 | 1.2708E+07 | −2.1235E+07 |

Figure 4A:
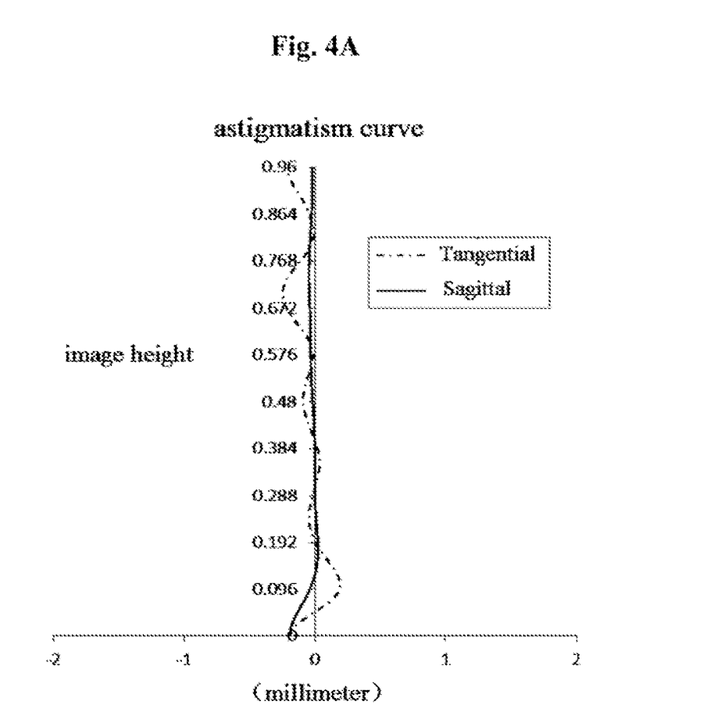
FIGS. 4A-4B show an astigmatism curve and a distortion curve of an optical imaging lens assembly according to Embodiment 2 respectively.
Figure 4B:
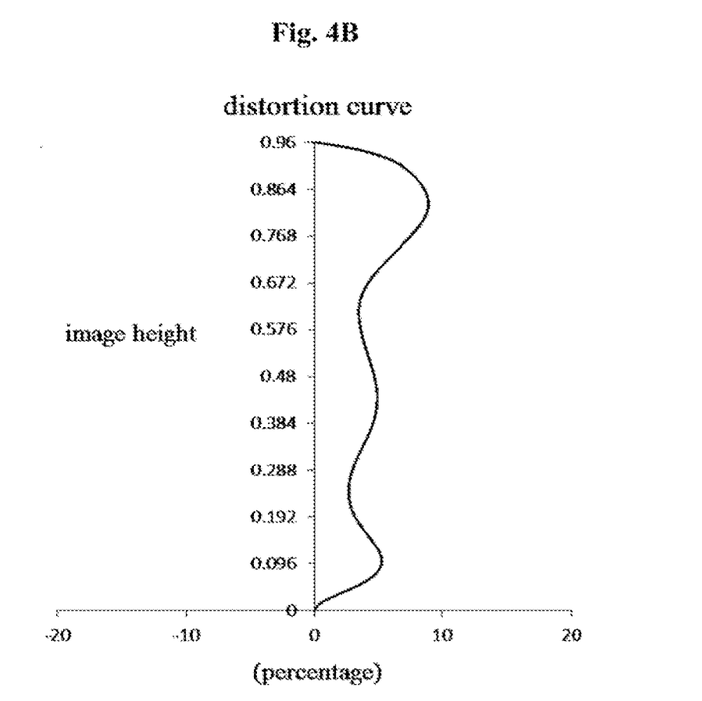

FIG. 4A shows an astigmatism curve of the optical imaging lens assembly according to Embodiment 2 to represent a tangential image surface curvature and a sagittal image surface curvature. FIG. 4B shows a distortion curve of the optical imaging lens assembly according to Embodiment 2 to represent distortion values corresponding to different image heights. According to FIGS. 4A-4B, it can be seen that the optical imaging lens assembly provided in Embodiment 2 may achieve high imaging quality.

Embodiment 3

Figure 5:
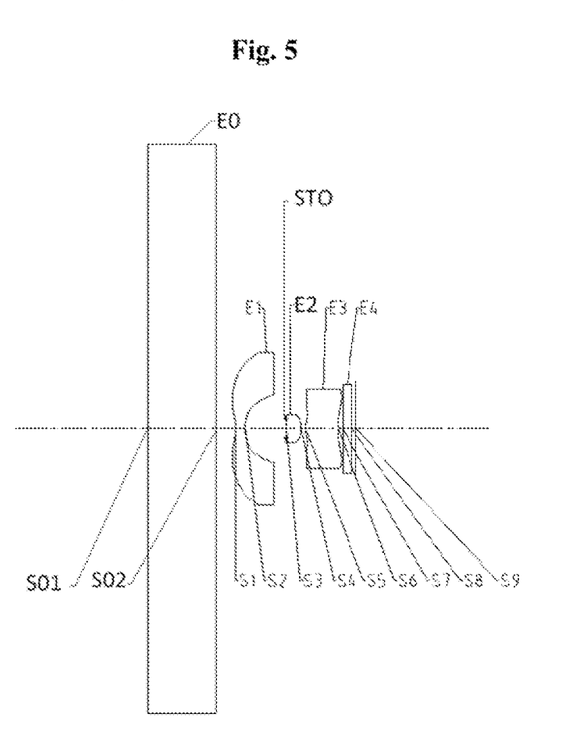
FIG. 5 shows a structural schematic diagram of an optical imaging lens assembly according to Embodiment 3 of the disclosure.

An optical imaging lens assembly according to Embodiment 3 of the disclosure will be described below with reference to FIGS. 5-6B. FIG. 5 shows a structural schematic diagram of an optical imaging lens assembly according to Embodiment 3 of the disclosure.

As shown in FIG. 5, the optical imaging lens assembly sequentially includes from an object side to an image side: a glass screen E0, a first lens E1, a diaphragm STO, a second lens E2, a third lens E3, an optical filter E4 and an imaging surface S9.

The glass screen E0 has an object-side surface S01 and an image-side surface S02. The first lens E1 has a negative refractive power, an object-side surface S1 thereof is a concave surface, while an image-side surface S2 thereof is a concave surface. The second lens E2 has a positive refractive power, an object-side surface S3 thereof is a convex surface, and an image-side surface S4 thereof is a convex surface. The third lens E3 has a positive refractive power, an object-side surface S5 thereof is a convex surface, and an image-side surface S6 thereof is a concave surface. The optical filter E4 has an object-side surface S7 and an image-side surface S8. Light from an object sequentially passes through each of the surfaces S01 to S8 and is finally imaged on the imaging surface S9.

In the embodiment, a total effective focal length f of the optical imaging lens assembly is 0.27 mm. TTL is a total length of the optical imaging lens assembly, and TTL is 2.75 mm. ImgH is a half of a diagonal length of an effective pixel region on the imaging surface S9 of the optical imaging lens assembly, and ImgH is 0.96 mm. FOV is a field of view of the optical imaging lens assembly, and FOV is maximally 142.9°.

Table 5 shows a basic parameter table of the optical imaging lens assembly of Embodiment 3, wherein the units of the curvature radius, the thickness/distance and the focal length are all millimeters (mm). Table 6 shows high-order coefficients that may be used for each aspheric mirror surface in Embodiment 3. A surface type of each aspheric surface may be defined by the formula (1) given in Embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 1.0300E−06 | | | | |
| S01 | Spherical | Infinite | 1.5450 | 1.52 | 64.2 | | |
| S02 | Spherical | Infinite | 0.4345 | | | | |
| S1 | Aspheric | −0.9000 | 0.2200 | 1.62 | 25.9 | −1.12 | −5.1573 |
| S2 | Aspheric | 3.1972 | 0.9167 | | | | −33.5537 |
| STO | Spherical | Infinite | 0.0133 | | | | |
| S3 | Aspheric | 2.4772 | 0.3342 | 1.54 | 56.1 | 1.42 | −88.7204 |
| S4 | Aspheric | −1.0667 | 0.1000 | | | | 9.3726 |
| S5 | Aspheric | 0.3474 | 0.7481 | 1.54 | 56.1 | 0.64 | −90.0000 |
| S6 | Aspheric | 11.1858 | 0.1011 | | | | 52.1808 |
| S7 | Spherical | Infinite | 0.2163 | 1.52 | 64.2 | | |
| S8 | Spherical | Infinite | 0.1036 | | | | |
| S9 | Spherical | Infinite | | | | | |

TABLE 6

| Surface number | A4 | A6 | A8 | A10 | A12 |
|---|---|---|---|---|---|
| S1 | 9.3870E−01 | −1.4593E+00 | 1.4171E+00 | −8.6256E−01 | 3.3093E−01 |
| S2 | 9.0485E+00 | −1.3771E+02 | 1.3354E+03 | −7.5363E+03 | 2.6002E+04 |
| S3 | −2.8332E+01 | 5.2365E+03 | −5.6751E+05 | 3.5442E+07 | −1.3216E+09 |
| S4 | −1.5317E+01 | 4.3720E+02 | −1.2449E+04 | 2.3617E+05 | −2.9339E+06 |
| S5 | 2.9808E+01 | −1.3348E+03 | 3.3945E+04 | −5.4343E+05 | 5.5590E+06 |
| S6 | −6.7749E−01 | 3.9847E+01 | −4.2069E+02 | 2.4583E+03 | −9.5098E+03 |

| Surface number | A14 | A16 | A18 | A20 |
|---|---|---|---|---|
| S1 | −7.8632E−02 | 1.1130E−02 | −8.5698E−04 | 2.7597E−05 |
| S2 | −5.5638E+04 | 7.2015E+04 | −5.1591E+04 | 1.5671E+04 |
| S3 | 2.8940E+10 | −3.4322E+11 | 1.7001E+12 | 0.0000E+00 |
| S4 | 2.3543E+07 | −1.1853E+08 | 3.4012E+08 | −4.2420E+08 |
| S5 | −3.6184E+07 | 1.4464E+08 | −3.2312E+08 | 3.0837E+08 |
| S6 | 2.5698E+04 | −4.9128E+04 | 6.5908E+04 | −6.0450E+04 |

Figure 6A:
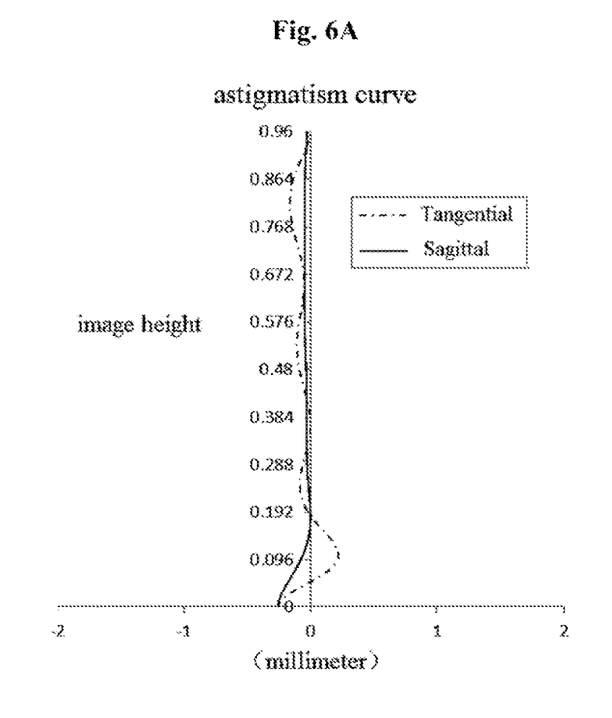
FIGS. 6A-6B show an astigmatism curve and a distortion curve of an optical imaging lens assembly according to Embodiment 3 respectively.
Figure 6B:
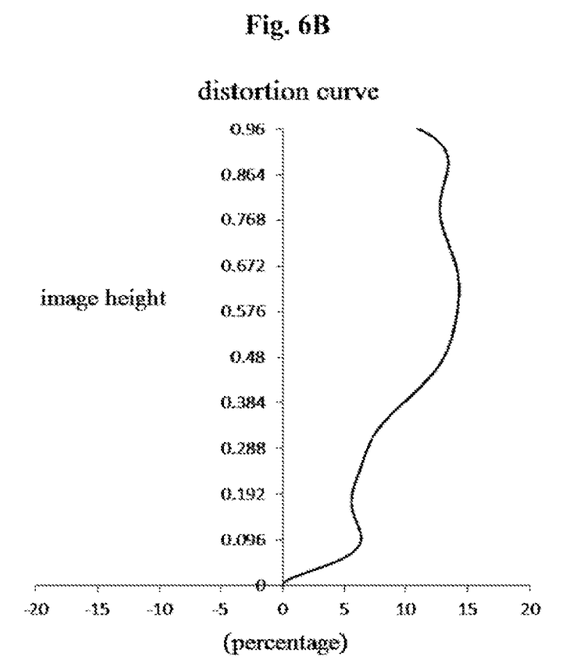

FIG. 6A shows an astigmatism curve of the optical imaging lens assembly according to Embodiment 3 to represent a tangential image surface curvature and a sagittal image surface curvature. FIG. 6B shows a distortion curve of the optical imaging lens assembly according to Embodiment 3 to represent distortion values corresponding to different image heights. According to FIGS. 6A-6B, it can be seen that the optical imaging lens assembly provided in Embodiment 3 may achieve high imaging quality.

Embodiment 4

Figure 7:
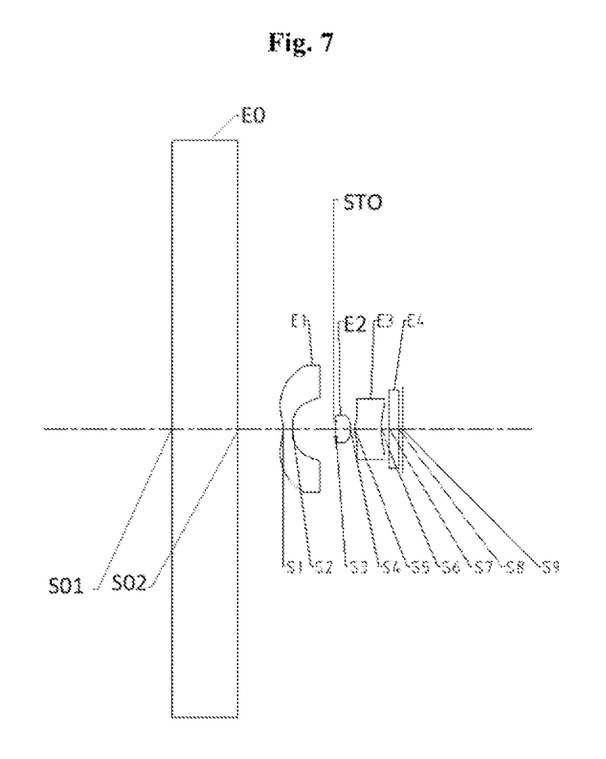
FIG. 7 shows a structural schematic diagram of an optical imaging lens assembly according to Embodiment 4 of the disclosure.

An optical imaging lens assembly according to Embodiment 4 of the disclosure will be described below with reference to FIGS. 7-8B. FIG. 7 shows a structural schematic diagram of an optical imaging lens assembly according to Embodiment 4 of the disclosure.

As shown in FIG. 7, the optical imaging lens assembly sequentially includes from an object side to an image side: a glass screen E0, a first lens E1, a diaphragm STO, a second lens E2, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a positive refractive power, an object-side surface S5 thereof is a convex surface, and an image-side surface S6 thereof is a concave surface. The optical filter E4 has an object-side surface S7 and an image-side surface S8. Light from an object sequentially passes through each of the surfaces S01 to S8 and is finally imaged on the imaging surface S9.

In the embodiment, a total effective focal length f of the optical imaging lens assembly is 0.29 mm. TTL is a total length of the optical imaging lens assembly, and TTL is 2.82 mm. ImgH is a half of a diagonal length of an effective pixel region on the imaging surface S9 of the optical imaging lens assembly, and ImgH is 1.04 mm. FOV is a field of view of the optical imaging lens assembly, and FOV is maximally 141.4°.

Table 7 shows a basic parameter table of the optical imaging lens assembly of Embodiment 4, wherein the units of the curvature radius, the thickness/distance and the focal length are all millimeters (mm). Table 8 shows high-order coefficients that may be used for each aspheric mirror surface in Embodiment 4. A surface type of each aspheric surface may be defined by the formula (1) given in Embodiment 1.

TABLE 7

| Surface number | Surface type | Curvature radius | Thickness/ distance | Refractive index | Abbe number | Focal length | Conic coefficient |
|---|---|---|---|---|---|---|---|
| OBJ | Spherical | Infinite | 1.0300E−06 | | | | |
| S01 | Spherical | Infinite | 1.5450 | 1.52 | 64.2 | | |
| S02 | Spherical | Infinite | 1.0345 | | | | |
| S1 | Aspheric | −0.9000 | 0.2200 | 1.62 | 25.9 | −1.35 | −5.2170 |
| S2 | Aspheric | 12.0234 | 0.9926 | | | | 80.3577 |
| STO | Spherical | Infinite | 0.0050 | | | | |
| S3 | Aspheric | 2.9211 | 0.3491 | 1.54 | 56.1 | 1.73 | −77.0955 |
| S4 | Aspheric | −1.3255 | 0.1000 | | | | 12.9985 |
| S5 | Aspheric | 0.3365 | 0.6252 | 1.54 | 56.1 | 0.62 | −90.0000 |
| S6 | Aspheric | 35.2802 | 0.2034 | | | | −90.0000 |
| S7 | Spherical | Infinite | 0.2163 | 1.52 | 64.2 | | |
| S8 | Spherical | Infinite | 0.1036 | | | | |
| S9 | Spherical | Infinite | | | | | |

TABLE 8

| Surface number | A4 | A6 | A8 | A10 | A12 |
|---|---|---|---|---|---|
| S1 | 1.0755E+00 | −1.6790E+00 | 1.6460E+00 | −1.0350E+00 | 4.2564E−01 |
| S2 | 7.0318E+00 | −7.7605E+01 | 5.9007E+02 | −2.6192E+03 | 7.0956E+03 |
| S3 | −1.6545E+01 | 2.4105E+03 | −2.1418E+05 | 1.0735E+07 | −3.1511E+08 |
| S4 | −1.4373E+01 | 4.3167E+02 | −1.2485E+04 | 2.3660E+05 | −2.9339E+06 |
| S5 | 3.0920E+01 | −1.3371E+03 | 3.3929E+04 | −5.4333E+05 | 5.5590E+06 |
| S6 | −1.0295E+00 | 6.1539E+01 | −7.8172E+02 | 5.7850E+03 | −2.8624E+04 |

| Surface number | A14 | A16 | A18 | A20 |
|---|---|---|---|---|
| S1 | −1.1183E−01 | 1.7831E−02 | −1.5613E−03 | 5.7433E−05 |
| S2 | −1.2064E+04 | 1.2858E+04 | −8.0168E+03 | 2.2478E+03 |
| S3 | 5.3041E+09 | −4.7081E+10 | 1.6986E+11 | 0.0000E+00 |
| S4 | 2.3543E+07 | −1.1853E+08 | 3.4012E+08 | −4.2420E+08 |
| S5 | −3.6184E+07 | 1.4464E+08 | −2.3312E+08 | 3.0837E+08 |
| S6 | 9.8056E+04 | −2.3450E+05 | 3.8910E+05 | −4.3795E+05 |

Figure 8A:
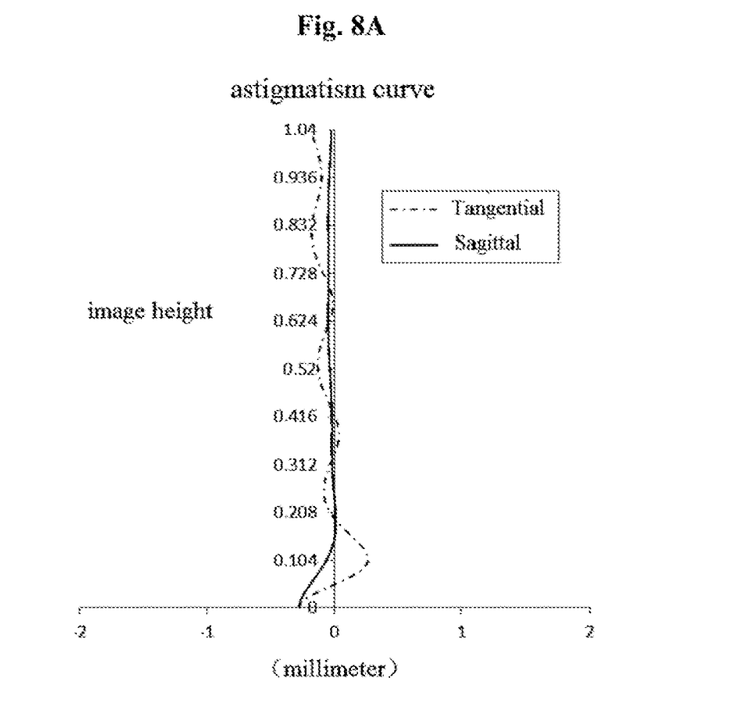
FIGS. 8A-8B show an astigmatism curve and a distortion curve of an optical imaging lens assembly according to Embodiment 4 respectively.
Figure 8B:
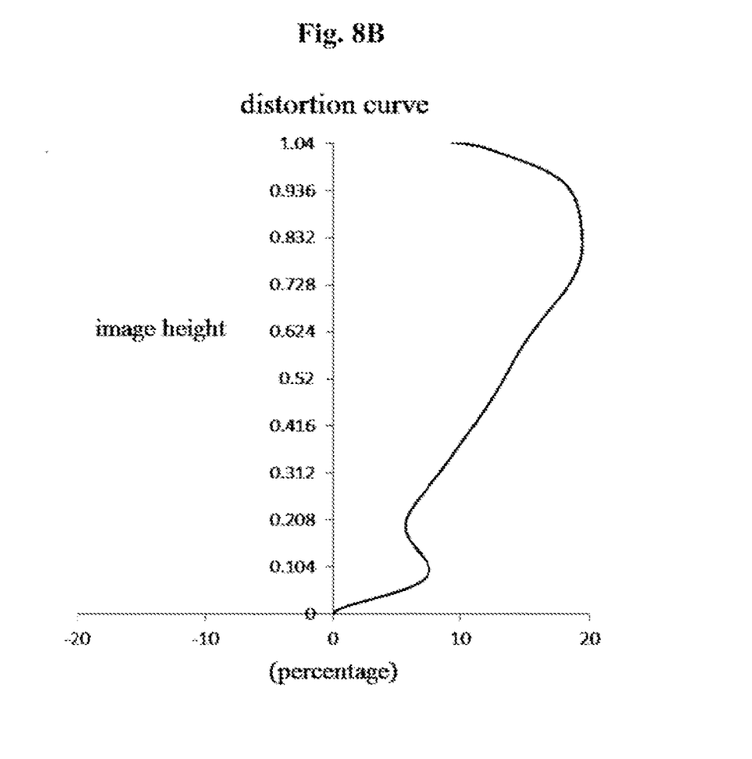

FIG. 8A shows an astigmatism curve of the optical imaging lens assembly according to Embodiment 4 to represent a tangential image surface curvature and a sagittal image surface curvature. FIG. 8B shows a distortion curve of the optical imaging lens assembly according to Embodiment 4 to represent distortion values corresponding to different image heights. According to FIGS. 8A-8B, it can be seen that the optical imaging lens assembly provided in Embodiment 4 may achieve high imaging quality.

Embodiment 5

Figure 9:
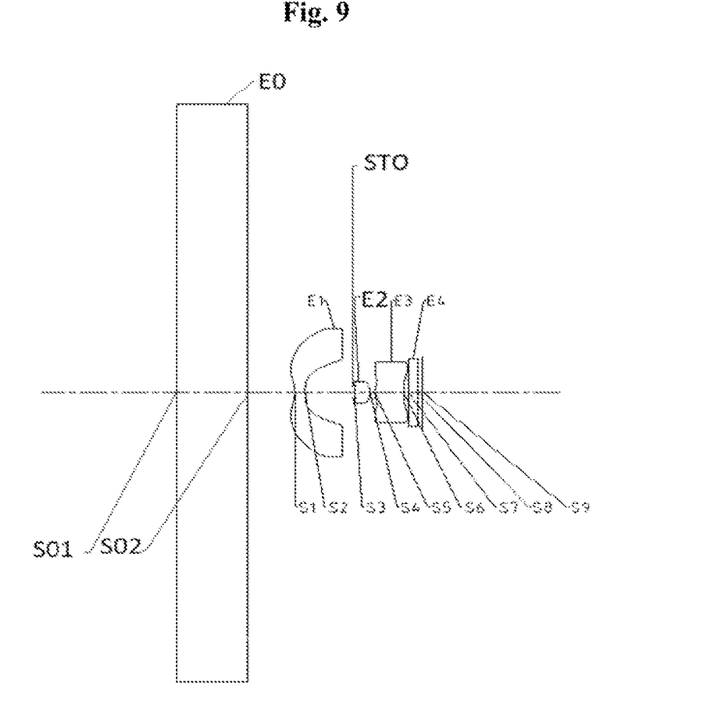
FIG. 9 shows a structural schematic diagram of an optical imaging lens assembly according to Embodiment 5 of the disclosure.

An optical imaging lens assembly according to Embodiment 5 of the disclosure will be described below with reference to FIGS. 9-10B. FIG. 9 shows a structural schematic diagram of an optical imaging lens assembly according to Embodiment 5 of the disclosure.

As shown in FIG. 9, the optical imaging lens assembly sequentially includes from an object side to an image side: a glass screen E0, a first lens E1, a diaphragm STO, a second lens E2, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a convex surface. The third lens E3 has a positive refractive power, an object-side surface S5 thereof is a convex surface, and an image-side surface S6 thereof is a concave surface. The optical filter E4 has an object-side surface S7 and an image-side surface S8. Light from an object sequentially passes through each of the surfaces S01 to S8 and is finally imaged on the imaging surface S9.

In the embodiment, a total effective focal length f of the optical imaging lens assembly is 0.29 mm. TTL is a total length of the optical imaging lens assembly, and TTL is 2.81 mm. ImgH is a half of a diagonal length of an effective pixel region on the imaging surface S9 of the optical imaging lens assembly, and ImgH is 1.03 mm. FOV is a field of view of the optical imaging lens assembly, and FOV is maximally 144.0°.

Table 9 shows a basic parameter table of the optical imaging lens assembly of Embodiment 5, wherein the units of the curvature radius, the thickness/distance and the focal length are all millimeters (mm). Table 10 shows high-order coefficients that may be used for each aspheric mirror surface in Embodiment 5. A surface type of each aspheric surface may be defined by the formula (1) given in Embodiment 1.

TABLE 9

| Surface number | Surface type | Curvature radius | Thickness/ distance | Material Refractive index | Abbe number | Focal length | Conic coefficient |
| --- | --- | --- | --- | --- | --- | --- | --- |
| OBJ | Spherical | Infinite | 1.0300E−06 | | | | |
| S01 | Spherical | Infinite | 1.5450 | 1.52 | 64.2 | | |
| S02 | Spherical | Infinite | 1.0345 | | | | |
| S1 | Aspheric | −0.9000 | 0.2200 | 1.62 | 25.9 | −1.39 | −4.7469 |
| S2 | Aspheric | 19.5236 | 1.0634 | | | | 66.9064 |
| STO | Spherical | Infinite | 0.0103 | | | | |
| S3 | Aspheric | 4.0878 | 0.3407 | 1.54 | 56.1 | 1.62 | −90.0000 |
| S4 | Aspheric | −1.0887 | 0.1000 | | | | 9.4818 |
| S5 | Aspheric | 0.3500 | 0.6512 | 1.54 | 56.1 | 0.65 | −78.8602 |
| S6 | Aspheric | 25.7503 | 0.1000 | | | | 48.0189 |
| S7 | Spherical | Infinite | 0.2163 | 1.52 | 64.2 | | |
| S8 | Spherical | Infinite | 0.1036 | | | | |
| S9 | Spherical | Infinite | | | | | |

TABLE 10

| Surface number | A4 | A6 | A8 | A10 | A12 |
| --- | --- | --- | --- | --- | --- |
| S1 | 7.2788E−01 | −8.4302E−01 | 6.0117E−01 | −2.6821E−01 | 7.5834E−02 |
| S2 | 4.3614E+00 | −3.7542E+01 | 2.2861E+02 | −8.1123E+02 | 1.7403E+03 |
| S3 | −1.6660E+01 | 2.5585E+03 | −2.5112E+05 | 1.3982E+07 | −4.5859E+08 |
| S4 | −1.5794E+01 | 4.4401E+02 | −1.2466E+04 | 2.3605E+05 | −2.9339E+06 |
| S5 | 3.0400E+01 | −1.3379E+03 | 3.3950E+04 | −5.4338E+05 | 5.5590E+06 |
| S6 | 5.6873E−01 | 3.2163E+01 | −4.4803E+02 | 3.1735E+03 | −1.4559E+04 |

| Surface number | A14 | A16 | A18 | A20 |
| --- | --- | --- | --- | --- |
| S1 | −1.3355E−02 | 1.4078E−03 | −8.1022E−05 | 1.9558E−06 |
| S2 | −2.2930E+03 | 1.8151E+03 | −7.9252E+02 | 1.4668E+02 |
| S3 | 8.6416E+09 | −8.5941E+10 | 3.4832E+11 | 0.0000E+00 |
| S4 | 2.3543E+07 | −1.1853E+08 | 3.4012E+08 | −4.2420E+08 |
| S5 | −3.6184E+07 | 1.4464E+08 | −3.2312E+08 | 3.0837E+08 |
| S6 | 4.5789E+04 | −1.0004E+05 | 1.5095E+05 | −1.5387E+05 |

Figure 10A:
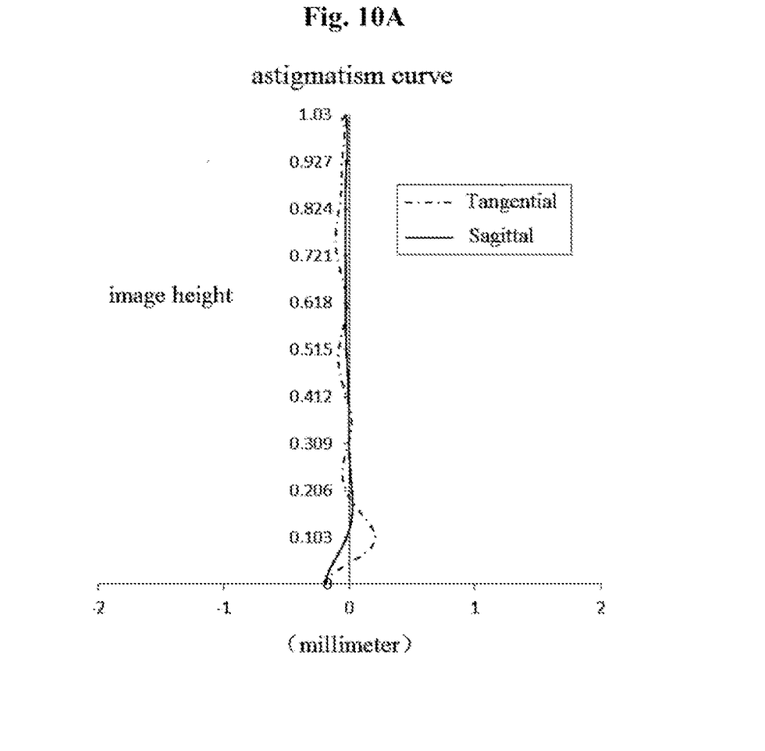
FIGS. 10A-10B show an astigmatism curve and a distortion curve of an optical imaging lens assembly according to Embodiment 5 respectively.
Figure 10B:
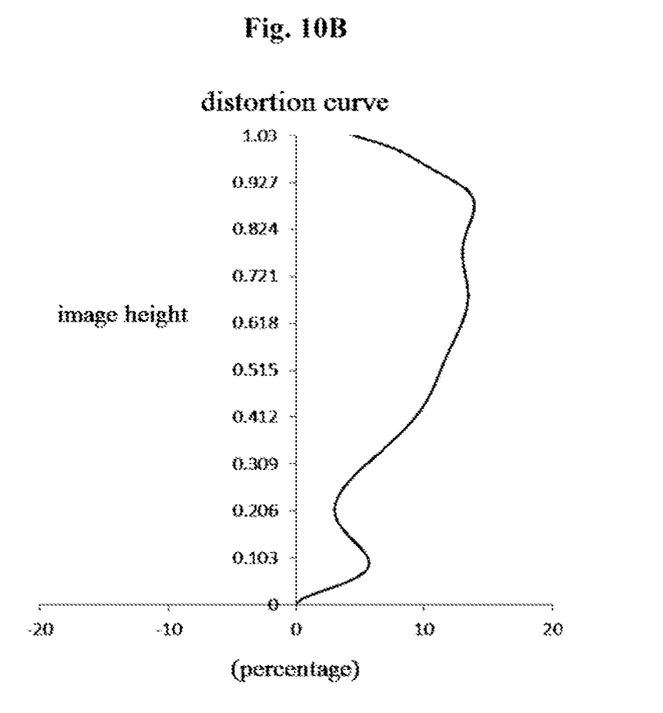

FIG. 10A shows an astigmatism curve of the optical imaging lens assembly according to Embodiment 5 to represent a tangential image surface curvature and a sagittal image surface curvature. FIG. 10B shows a distortion curve of the optical imaging lens assembly according to Embodiment 5 to represent distortion values corresponding to different image heights. According to FIGS. 10A-10B, it can be seen that the optical imaging lens assembly provided in Embodiment 5 may achieve high imaging quality.

From the above, Embodiment 1 to Embodiment 5 satisfy a relationship shown in Table 11 respectively.

TABLE 11

| Conditional expression/embodiment | 1 | 2 | 3 | 4 | 5 |
|---|---|---|---|---|---|
| f/EPD | 1.40 | 1.36 | 1.38 | 1.48 | 1.49 |
| f1/f | −3.58 | −2.99 | −4.07 | −4.63 | −4.85 |
| f2/f | 6.07 | 4.70 | 5.16 | 5.91 | 5.63 |
| f3/f | 2.38 | 2.22 | 2.34 | 2.13 | 2.25 |
| (R3 − R4)/(R3 + R4) | 1.38 | 3.29 | 2.51 | 2.66 | 1.73 |
| CT3/R5 | 1.75 | 1.54 | 2.15 | 1.86 | 1.86 |
| TTL/T12 | 3.01 | 3.78 | 2.96 | 2.82 | 2.61 |
| CT2/CT1 | 1.34 | 1.13 | 1.52 | 1.59 | 1.55 |
| DT11/DT21 | 8.69 | 5.93 | 8.13 | 7.84 | 9.76 |
| DT32/DT22 | 2.62 | 2.25 | 2.77 | 2.22 | 2.77 |
| SL/f23 | 3.04 | 3.14 | 3.38 | 3.26 | 3.09 |
| SAG11/ET1 | 1.80 | 1.21 | 1.50 | 1.45 | 1.98 |
| ET3/ET2 | 1.83 | 2.04 | 3.77 | 3.03 | 3.33 |

The disclosure also provides a fingerprint identification device, which includes the above-described optical imaging lens assembly. Moreover, an imaging sensor in the fingerprint identification device may be configured to convert an optical signal entering the imaging sensor from the optical imaging lens assembly into an electric signal.

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising from an object side to an image side along an optical axis:
    a first lens with a negative refractive power, wherein an object-side surface thereof is a concave surface, and an image-side surface thereof is a concave surface;
    a second lens with a positive refractive power, wherein an object-side surface thereof is a convex surface, and an image-side surface thereof is a convex surface; and
    a third lens with a positive refractive power, wherein an object-side surface thereof is a convex surface;
    wherein a total effective focal length f of the optical imaging lens assembly and an Entrance Pupil Diameter (EPD) of the optical imaging lens assembly satisfy f/EPD<1.5; and
    FOV is a maximum field of view of the optical imaging lens assembly, and FOV satisfies 140°<FOV<160°; and
    a center thickness CT3 of the third lens on the optical axis and a curvature radius R5 of the object-side surface of the third lens satisfy 1.4<CT3/R5<2.3.

2. The optical imaging lens assembly according to claim 1, wherein an effective focal length f1 of the first lens and the total effective focal length f of the optical imaging lens assembly satisfy −5.0<f1/f<−2.8.

3. The optical imaging lens assembly according to claim 1, wherein an effective focal length f2 of the second lens and the total effective focal length f of the optical imaging lens assembly satisfy 4.6<f2/f<6.2.

4. The optical imaging lens assembly according to claim 1, wherein an effective focal length f3 of the third lens and the total effective focal length f of the optical imaging lens assembly satisfy 2.0<f3/f<2.5.

5. The optical imaging lens assembly according to claim 1, wherein a curvature radius R3 of the object-side surface of the second lens and a curvature radius R4 of the image-side surface of the second lens satisfy 1.2<(R3−R4)/(R3+R4)<3.4.

6. The optical imaging lens assembly according to claim 1, wherein TTL is a distance from the object-side surface of the first lens to an imaging surface of the optical imaging lens assembly, and TTL and a spacing distance T12 of the first lens and the second lens on the optical axis satisfy 2.5<TTL/T12<3.9.

7. The optical imaging lens assembly according to claim 1, wherein a center thickness CT1 of the first lens on the optical axis and a center thickness CT2 of the second lens on the optical axis satisfy 1.0<CT2/CT1<1.7.

8. The optical imaging lens assembly according to claim 1, wherein an effective semi-diameter DT11 of the object-side surface of the first lens and an effective semi-diameter DT21 of the object-side surface of the second lens satisfy 5.8<DT11/DT21<9.9.

9. The optical imaging lens assembly according to claim 1, wherein an effective semi-diameter DT32 of an image-side surface of the third lens and an effective semi-diameter DT22 of the image-side surface of the second lens satisfy 2.1<DT32/DT22<2.9.

10. The optical imaging lens assembly according to claim 1, wherein SAG11 is a distance from an intersection point of the object-side surface of the first lens and the optical axis to an effective radius vertex of the object-side surface of the first lens on the optical axis, and SAG11 and an edge thickness ET1 of the first lens satisfy 1.1<SAG11/ET1<2.1.

11. The optical imaging lens assembly according to claim 1, wherein an edge thickness ET3 of the third lens and an edge thickness ET2 of the second lens satisfy 1.7<ET3/ET2<3.9.

12. The optical imaging lens assembly according to claim 1, wherein the optical imaging lens assembly further comprises a diaphragm; SL is a distance from the diaphragm to an imaging surface of the optical imaging lens assembly on the optical axis, and SL and a combined focal length f23 of the second lens and the third lens satisfy 2.9<SL/f23<3.5.

13. An optical imaging lens assembly, sequentially comprising from an object side to an image side along an optical axis:

a first lens with a negative refractive power, wherein an object-side surface thereof is a concave surface, and an image-side surface thereof is a concave surface;

a second lens with a positive refractive power, wherein an object-side surface thereof is a convex surface, and an image-side surface thereof is a convex surface; and a third lens with a positive refractive power, wherein an object-side surface thereof is a convex surface, wherein a total effective focal length f of the optical imaging lens assembly and an Entrance Pupil Diameter (EPD) of the optical imaging lens assembly satisfy f/EPD<1.5; and a center thickness CT3 of the third lens on the optical axis and a surface radius R5 of the object-side surface of the third lens satisfy 1.4<CT3/R5<2.3.

14. A fingerprint identification device, comprising:

the optical imaging lens assembly according to claim 1, further comprising a glass screen on an object side; and an imaging sensor, configured to convert an optical signal entering the imaging sensor from the optical imaging lens assembly into an electric signal.

\* \* \* \* \*